United States Patent
Parkin et al.

(10) Patent No.: US 6,197,439 B1
(45) Date of Patent: Mar. 6, 2001

(54) LAMINATED MAGNETIC STRUCTURES WITH ULTRA-THIN TRANSITION METAL SPACER LAYERS

(75) Inventors: Stuart Stephen Papworth Parkin; David Allen Thompson, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/238,714

(22) Filed: Jan. 28, 1999

(51) Int. Cl.$^7$ .................................................... B32B 15/00
(52) U.S. Cl. .......................... 428/678; 427/131; 427/132; 428/668; 428/680; 428/681; 428/693; 428/900; 428/928
(58) Field of Search ..................... 427/131, 132; 428/693, 900, 928, 678, 680, 681, 668

(56) References Cited

U.S. PATENT DOCUMENTS

| | | | |
|---|---|---|---|
| 5,018,038 | 5/1991 | Nakanishi | 360/126 |
| 5,132,859 | 7/1992 | Andricacos et al. | 360/113 |
| 5,157,570 | 10/1992 | Shukovsky et al. | 360/126 |
| 5,239,435 | 8/1993 | Jeffers et al. | 360/126 |
| 5,313,356 | 5/1994 | Ohkubo et al. | 360/126 |
| 5,341,118 | 8/1994 | Parkin et al. | 338/32 R |
| 5,408,377 | * 4/1995 | Gurney et al. | |

(List continued on next page.)

OTHER PUBLICATIONS

Slonczewski, J. et al., Micromagnetics of laminated permalloy films, IEEE Trans. Mag., 24 (3), pp. 2045–2054, May 1988.

Parkin, S. et al., Oscillations in exchange coupling and magnetoresistance in metallic super–lattice structures:Co/Ru, Co/Cr, and Fe/Cr, Phys. Rev. Let., 64(19), pp. 2304–2307, May '90.

Parkin, S., Spin engineering:direct determination of the ruderman–kittek–kasuya–yosida far–field range function in ruthenium, Phys. Rev. B, pp. 7131–7134, Oct. 1991.

Parkin, S., Systematic Variation of the strength and oscillation period of indirect magnetic exchange coupling through the 3rd, 4d and 5d transition metals, Phys. Rev. Let., pp. 3598–3601, Dec. 1991.

Parkin, S. et al., Oscillatory exchange coupling and giant magnetosresistance via Cu–X alloys (X=Au, Fe, Ni), Europhys, Let., 24(1), pp. 71–76, 1993. (No Month Avail.)

Bloemen, P et al., Interlayer coupling in Co/Os multilayers, J. of Magnetism and Mag. Mat., 131, pp. 306–308, 1993. (no month avail.)

(List continued on next page.)

*Primary Examiner*—Bernard Pianalto
(74) *Attorney, Agent, or Firm*—Lumen Intellectual Property Services (57) ABSTRACT

Non-magnetic transition metal spacer layers 2.5 to 50 Angstroms thick with compositions of Os, Ru and Re are used in laminated magnetic structures. The ultra-thin non-magnetic transition metal spacer layers are useful to fabricate micron and sub-micron laminated magnetic devices. The laminated magnetic structures using ultra-thin non-magnetic transition metal spacer layers of Os, Ru and Re have anti-ferromagnetic coupling between the magnetic layers. The anti-ferromagnetic coupling provides a mechanism for reduced edge curling and efficient directional magnetization. Alloying the non-magnetic transition metal layer provides a method for engineering coupling strengths, coercivities and remanences in magnetic structures useful for high frequency applications. These laminated magnetic structure have applications in magnetic read head, magnetic write head, magnetic memory, and miniature transformer devices.

16 Claims, 7 Drawing Sheets

U.S. PATENT DOCUMENTS

| | | | |
|---|---|---|---|
| 5,585,986 | 12/1996 | Parkin | 360/113 |
| 5,701,222 | 12/1997 | Gill et al. | 360/113 |

OTHER PUBLICATIONS

Soohoo, S., Switching Dynamics in a thin film recording head, IEEE Trans. Mag., 18(6), pp. 1128–1130, 1982. (No Month Avail.)

Lazzari, J. et al., Integrated magnetic recordingheads, IEEE Trans. Mag., 7(1), pp. 146–150, 1971. (No Month Avail.)

Schilfgaarde, M. et al., Theory of oscillatory exchange coupling in Fe/(V,Cr) and Fe/(Cr,Mn) Phys. Rev. Let., 74 (20), pp. 4063–4066, May 1995.

* cited by examiner

PRIOR ART

PRIOR ART

LAMINATED MAGNETIC STRUCTURES WITH ULTRA-THIN TRANSITION METAL SPACER LAYERS

FIELD OF THE INVENTION

This invention relates generally to magnetic structures for use in magnetic devices. In particular this invention relates to multi-layer magnetic structures with ultra-thin non-magnetic transition metal spacer layers laminated between magnetic layers for applications in magnetic write heads, magnetic read heads, magnetic memory devices, miniature inductors and transformers.

BACKGROUND

Magnetic heads are being designed smaller and with magnetic properties that allow them to operate at higher frequencies. Magnetic heads are miniaturized to accommodate the small track widths and high bit densities of advanced magnetic media. High frequency operations of magnetic heads are required for faster data transfer. It is desirable to make pole tips of magnetic heads that are a micron or smaller and that can operate efficiently at high frequencies.

Laminated magnetic structures are made of multiple magnetic layers that are separated by non-magnetic layers, referred to as spacer layers, or of alternating magnetic layers with unique properties. The benefits of laminated magnetic structures over single component magnetic structures for application in magnetic read and write devices is well documented; for an early example see Lazzari et al., "Integrated Magnetic Recording Heads", IEEE Transactions of Magnetics Vol. Mag-7, No. 1, March 1971, pp. 146–150.

Laminating magnetic layers reduces eddy currents and eliminates closure domains in a magnetic device. R. F. Soohoo et al., "Switching Dynamics in a Thin Film Recording Head", IEEE Transactions of Magnetics Vol. Mag-18, No. 6, pp. 1128–1130, November 1982, considers the case of a single-turn thin-film head of width (W), wherein (W) is the width of the head perpendicular to the track direction. In the quiescent state, the head is comprised of multiple main domains aligned along the easy-axis-direction within the head, where the easy direction is parallel to the width of the head. In addition, there will be closure domains at the edges of the head with magnetizations aligned normal to the recording track along the hard axis direction. These closure domains occur to compensate for a large demagnetization field that would otherwise be present at the edges of the device. When a field is applied along the hard-axis-direction for the purpose of magnetizing the device, the main domains will respond to the field by rotation of their moments towards the field direction, whereas the edge domains will respond by wall motion. Wall motion reduces the responsiveness of the head. Magnetic structures with closure domains also have greatly reduced coercivities and increased remanences; none of these properties are desirable in magnetic devices operating at high frequencies. Further, the inefficiencies that result from closure domains become significantly more important with narrower head structures.

Magnetic devices that operate efficiently at high frequency magnetization fields, 1 MHz or greater, require that magnetic moments of the magnetic devices be aligned perpendicular to the magnetization gradient. In the case of magnetic heads, the magnetic moments need to be parallel with respect to the magnetic storage medium. This preferred orientation is referred to as an easy-axis-state. To optimize the efficiency of a device, the device magnetization needs to be fixed into the easy-axis-state weakly such that the quiescent magnetization of the device is the easy-axis-state, and yet the magnetic moments of the device respond rapidly to an applied magnetic field for the application at hand. Balancing quiescent magnetization of a device to the easy-axis-state and maintaining sufficiently high coercivity so that the magnetic moments efficiently flip in response to an applied magnetic field is one of the main challenges in designing magnetic structures. In U.S. Pat. No. 5,132,859 to Andricacos et al., and U.S. Pat. No. 5,157,570 to Shukovsky et al., laminated magnetic structures made with magnetic layers of high anisotropy ($H_k$) coupled to magnetic layers of low anisotropy ($H_k$) and low coercivity ($H_c$) are shown to have efficient read and write operations. In U.S. Pat. No. 5,239,435 to Jeffers et al, U.S. Pat. No. 5,018,038 to Nakanishi et al., and U.S. Pat. No. 5,313,356 Ohkubo et al., there are other examples of spacer layer applications for higher frequency operations of head devices and higher density recording discussed. Some of the problems with magnetic heads operating at high frequencies are addressed through implementing laminated magnetic structures. However, laminated magnetic structures using materials and methods in prior art are unsatisfactory to eliminate difficulties encountered in operations of devices at high frequencies when the devices are in the micron or sub-micron size regime.

Forming the pole tip of the magnetic recording head from a laminated structure with alternating magnetic and non-magnetic sub-layers helps reduce closure domains because there is a mechanism for flux closure in the magnetic structure. Flux closure is achieved because alternating magnetic sub-layers have their magnetic moments oriented in an alternating fashion along the easy-axis-direction. Laminated magnetic head structures still, however, have small closure domains and there is directional curling of the magnetic moments near the edges of the laminate. The edge curling region is a significant portion of a pole-tip area when the pole tip is made very small, on the order of microns. In order to keep this region to a small fraction of the total width of the pole-tip, the thicknesses of magnetic sub-layers and non-magnetic sub-layers must be reduced as the total width of the pole-tip is reduced.

Theoretical predictions for required spacer layer thicknesses of non-magnetic transition metal spacer layers to achieve the preferred easy-axis-state are detailed by Slonczewski et al. in "IEEE Transactions of Magnetics Vol. 25, No. 3, May 1988, pp. 245–254. For example, a magnetic head with a laminated pole-tip structure formed from permalloy with a width of half of a micron, will require a laminated structure with magnetic sub-layers 50 Angstroms thick and spacer layers 4 Angstroms thick. For typical materials used in prior art, it is very difficult to fabricate spacer layers which are this thin and that do not contain deleterious pin-holes and defects in the spacer layer structure. Magnetic layer structures that have pin-holes and defects in spacer layers act as if they are not laminated due to strong magnetic coupling between the magnetic layers.

It has been discovered that non-magnetic transition metals, when used as spacer layers, will couple magnetic layers in a laminated magnetic structure. The nature of this coupling has been the subject of extensive theoretical discussion and experimentation; see S. S. P. Parkin et al., "Oscillations in Exchange Coupling and Magnetoresitance in Metallic Superlatice Structures: Co/Ru, Co/Cr, and Fe/Cr", Phys. Rev. Lett. Vol. 64, No. 19, 1990, pp. 2304–2307; S. S. P. Parkin et al., "Spin Engineering: Direct Determination of the Ruder-Kittel-Kasuya-Yosida Far-field Range Function in Ruthenium", Phys. Rev. B., Vol. 44, No. 13, 1991, pp. 7131–7134; S. S. P. Parkin et al., "Systematic Variation of the Strength and Oscillation Period of Indirect Magnetic Exchange Coupling through 3d, 4d, and 5d Transition Metals", Phys. Rev. Lett., Vol. 67, No. 25, 1991, pp. 3598–3601; S. S. P Parkin et al., "Oscillatory Exchange Coupling and Giant Magnetoresistance via Cu-X Alloys (X=Au, Fe, Ni)", Europhys. Lett., Vol. 24, 1993, pp. 71–76; P. J. H. Bloemen, "Interlayer Coupling in Co/Os Multilayers", J. Magn. Magn. Mater. Vol. 121, 1993, pp. 306–308: and M. van Schilfgaarde et al., "Theory of Oscillatory Exchange coupling in Fe/(V,Cr) and Fe/(Cr,Mn)", Phys. Rev. Lett., Vol. 74, No. 20, 1995, pp. 4063–4067. It has been established that several elements of non-magnetic transition metals spacer layers in a magnetic device will generate anti-ferromagnetic (AFM) coupling in the limits of ultra-thin spacer layers (2 to 50 Angstroms). These coupling strengths are oscillatory with respect to spacer layer thickness and can be very strong. Parkin et al. in U.S. Pat. No. 5,341,118 describes multi-layered magnetic structures with non-magnetic spacer layers that strongly couple ferromagnetic layers and exhibit high magnetoresistance (MR) in fields that are sufficiently low to be useful in MR sensor construction. The AFM coupling is used to pin adjacent magnetic layers through thin transition metal spacer layers with thicknesses corresponding to the maximums of the oscillatory AFM coupling functions, whereby the magnetic permeability is essentially zero in the absence of an applied field and remains essentially zero in the absence of strong externally applied magnetic fields. Gill et al. in U.S. Pat. No. 5,701,222 and Parkin in U.S. Pat. No. 5,585,986 describe further MR sensor applications for strongly AFM coupled magnetic structures. However, for some applications what is needed is weak AFM coupling, whereby the magnetic structures exhibit non-zero permeability value in the presence of applied magnetic field. Examples, include very narrow track width head pole tips and flux extenders for read heads where the goal is to eliminate or reduce closure domains while maintaining a useful effective permeability values. What is needed is a method for making multi-layer magnetic structures containing non-magnetic transition metal layer that have been engineered to provide AFM coupling strengths useful for applications such as miniaturized pole tips and flux extenders.

OBJECTS AND ADVANTAGES

Accordingly, it is a primary object of the present invention to provide novel magnetic laminate structures containing ultra-thin spacer layers with Os, Ru, Re and alloys comprising at least two elements of Os, Ru and Re. The magnetic structures with ultra-thin non-magnetic transition metal spacer layers exhibit anti-ferromagnetic coupling of the magnetic layers with coupling strengths that are useful in device design for magnetic write heads, magnetic read heads, magnetic memory devices, miniature inductors and transformers.

The advantages of magnetic structure containing ultra-thin non-magnetic transition metal spacer layers are that the resultant structure are useful in the fabrication of miniaturized magnetic devices. Additionally, ultra-thin non-magnetic transition metal spacer layers provide a mechanism for canceling edge magnetization curling effects and provide a method for improving the frequency response of the devices fabricated.

It is a further object of the present invention to provide a method for making magnetic devices using ultra-thin (2.5–10 Angstroms) non-magnetic transition metal spacer layers of Os, Ru, Re and binary and ternary alloys of Os, Ru, Re. The magnetic devices have thin magnetic layers that are anti-ferromagnetically couple adjacent magnetic layers through the ultra thin non-magnetic transition metal spacer layer and will maintain the properties and advantages of a laminated magnetic structures thus providing a method to make a variety of miniaturized magnetic devices.

It is a further object of the present invention to make magnetic read and write heads with reduced ferromagnetic coupling that can occur because of imperfections in the layers, thus providing a mechanism to miniaturize magnetic read and write heads.

Lastly, it is an object of the invention to provide a method to engineer miniaturized pole tips and flux extenders with non-zero permeability values using weak antiferromagnetic coupling non-magnetic transition metal spacer layers laminated between magnetic layers.

SUMMARY

These objects and advantages are attained with multi-layer magnetic structures made of magnetic and non-magnetic layers. The magnetic layers are made with Ni, Fe, Co and the binary and ternary alloys formed from these elements with thicknesses ranging from 10 to 400 Angstroms. The non-magnetic spacer layers are transition metal layers of Os, Ru and Re and the binary and ternary alloys comprising combinations of these elements, wherein the spacer layers range from 2 to 50 Angstroms in thickness. The magnetic layers of the magnetic laminated structures are coupled anti-ferromagnetically with respect to each. The anti-ferromagnetic coupling occurs in the limits of thin non-magnetic transition metal spacer layers (2 to 50 Angstroms). The magnetic layer thicknesses, the non-magnetic transition metal spacer layer thicknesses and the compositions of both layers can be varied within the specifications of the invention to engineer magnetic properties of a magnetic device; these devices include magnetic write heads, magnetic read heads, magnetic memory devices, miniature inductors and transformers. The magnetic and non-magnetic layers can be deposited on any suitable substrate, such as nickel-phosphorus plated aluminum, glass, quartz, silicon and its oxides and various metals, by any suitable deposition method such as sputtering techniques including dc and rf magnetron sputtering and ion beam sputtering, laser pulse deposition and in some cases Electro-plating.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1A:
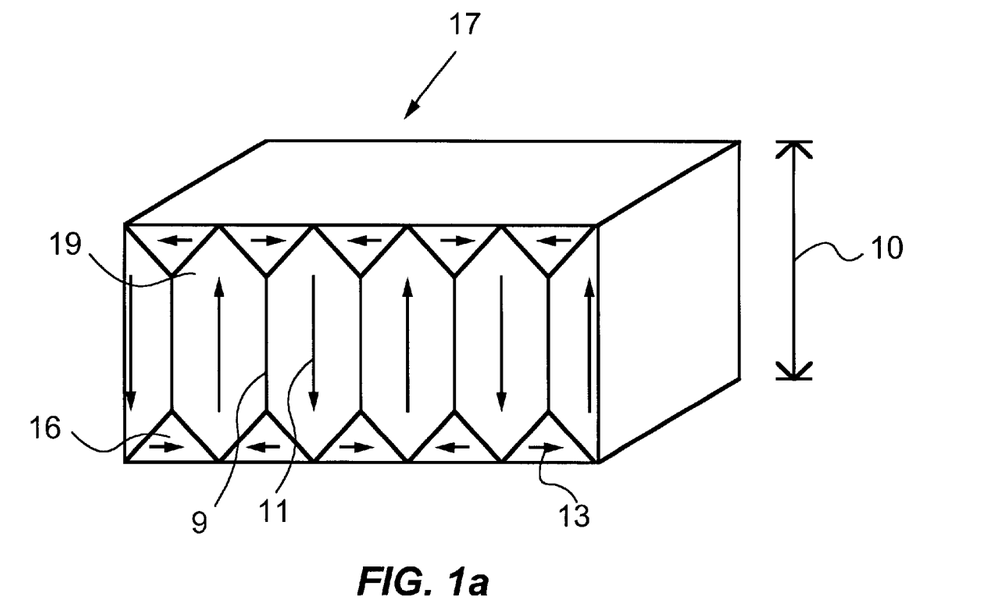
FIG. 1a is cross-sectional top view of a single component magnetic device showing the quiescent magnetic state with edge closure domains.
Figure 1B:
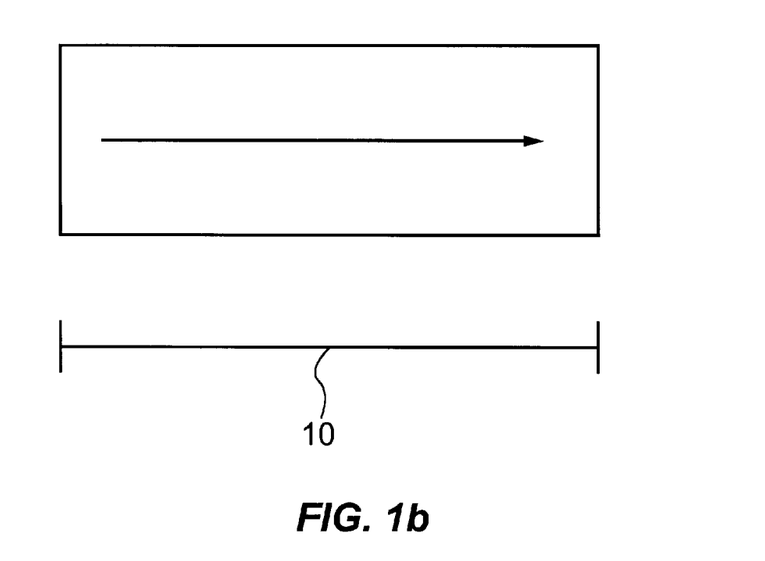
FIG. 1b is a front view of a single component magnetic device showing its easy magnetic axis oriented along the width of the device.

FIG. 1a–b show a top view and a front view, respectively, of single component magnetic device 17. This can be any ferromagnetic material commonly used in the art such as permalloy. The lines 9 represent the magnetic domain walls and the arrows 11 and 13 represent the magnetic moments within the domains. FIG. 1a shows the device 17 with an easy magnetic axis oriented along the width 10 of the device. This will also be referred to as the transverse direction. In the quiescent state, the magnetization within the interior of the device is in the form of multiple main magnetic domains 19 oriented in alternated transverse direction. The magnetic moments 13 near the edges of the device are perpendicular or near perpendicular to the magnetic moments 11 in the middle or bulk of the device. Both the interior domains 19 and the edge domains 16 have their magnetic moments largely oriented in the plane of the device. The areas where the magnetic moments do not align with the magnetic moments in the bulk of the device are referred to as closure domains 16. FIG. 1b shows the magnetization of the front edge 10 of the device showing the magnetic moment of the single magnetic layer from which the device is formed. Closure domains 16 do not significantly affect the operation of the magnetic device at frequencies below 1 Mz.

Figure 2A:
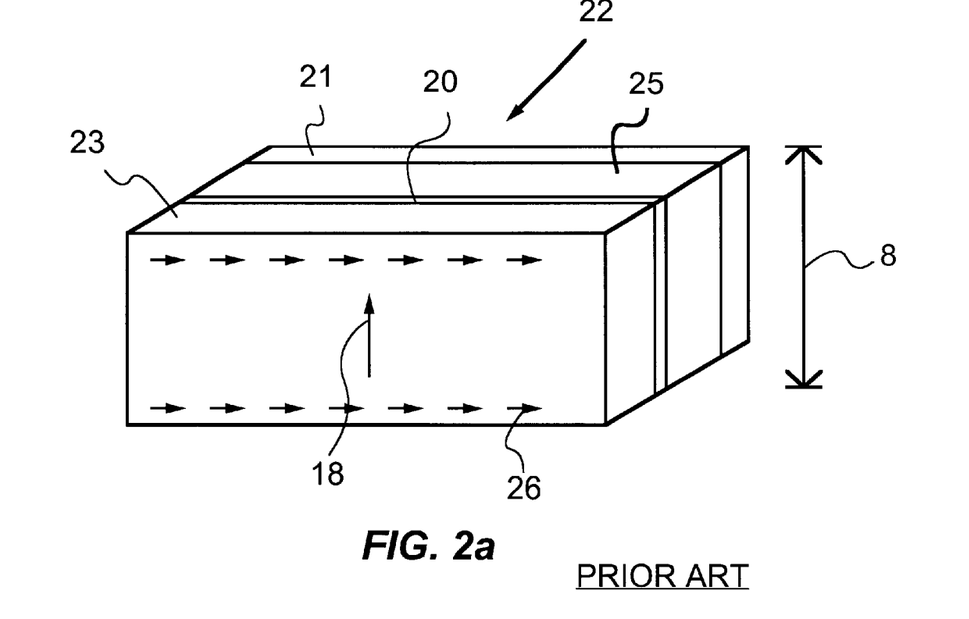
FIG. 2a is a cross-sectional top view of a magnetic structure with magnetic layers and a non-magnetic spacer layer made by methods in prior art showing the edge closure domains that are substantially in the same direction.
Figure 2B:
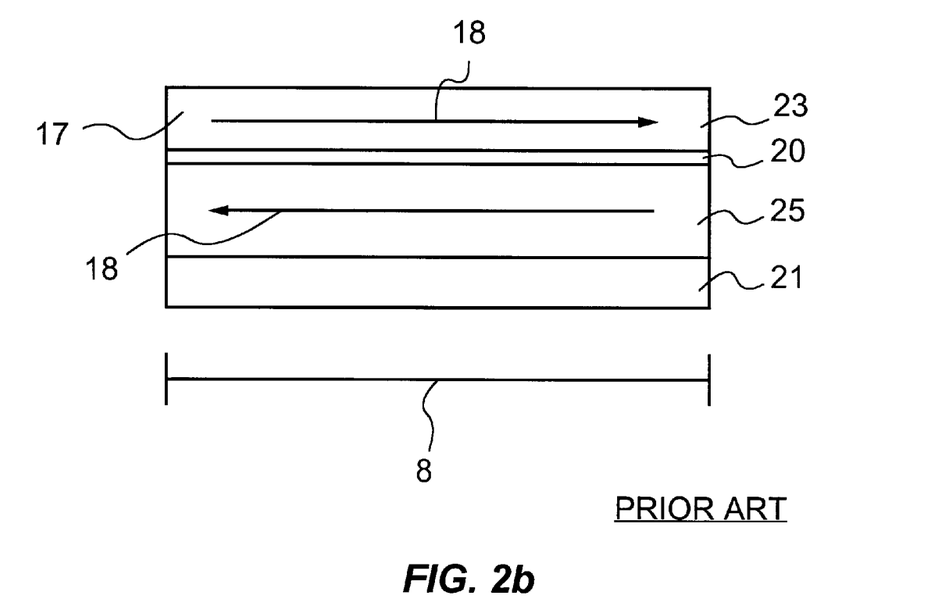
FIG. 2b is a front view a magnetic structure with magnetic layers and a non-magnetic spacer layer made by methods in prior art showing easy magnetic axis oriented along the width of the device.

FIG. 2a–b illustrate a top view and a front view of a magnetic structure 22 with non-magnetic spacer layers produced by methods in the prior art. The substrate 21 can be any suitable substrate such as nickel-phosphorus plated aluminum, glass, quartz or silicon. The layers can be deposited by any suitable method such as sputtering, pulsed laser deposition and electroplating. The magnetic layers 23 and 25 are generally in alternating sequence with a spacer layer 20 as shown. In this layered magnetic structure the magnetic moments 18 have weak ferromagnetic coupling with respect to each other and closure domains, such as 16 of FIG. 1a, are reduced or eliminated. This situation is a notable improvement over the single component magnetic structure illustrated in FIG. 1a. However, the magnetic moments 26 near the edges of the laminated structure 22 show an edge curling effect with all the magnetic moments 26 at the edges aligned in the same direction. FIG. 2b shows the alignment of the main bulk magnetic moments 18 on the front edge 8 of the magnetic structure 22.

Figure 3A:
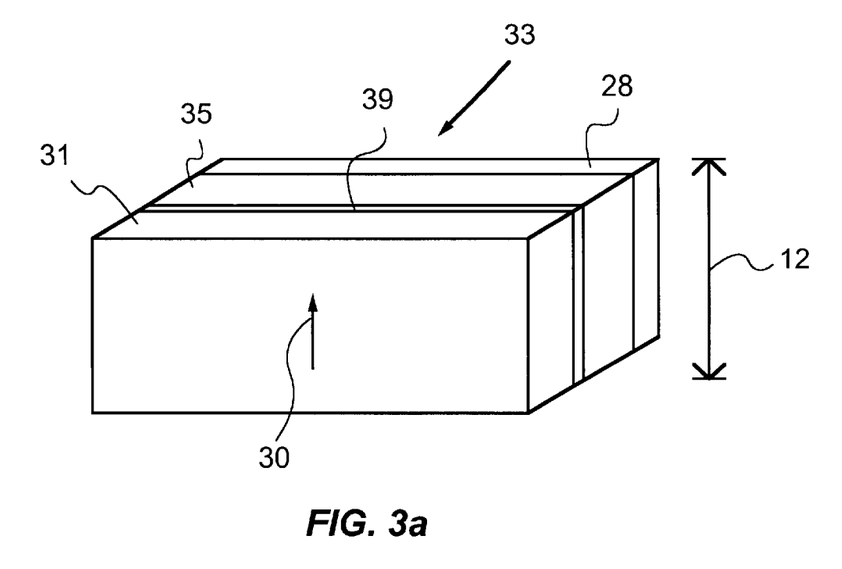
FIG. 3a is a cross-sectional top view of a magnetic structure with magnetic layers and a non-magnetic transition metal spacer layer made according to the invention with out directional magnetization from closure domains.
Figure 3B:
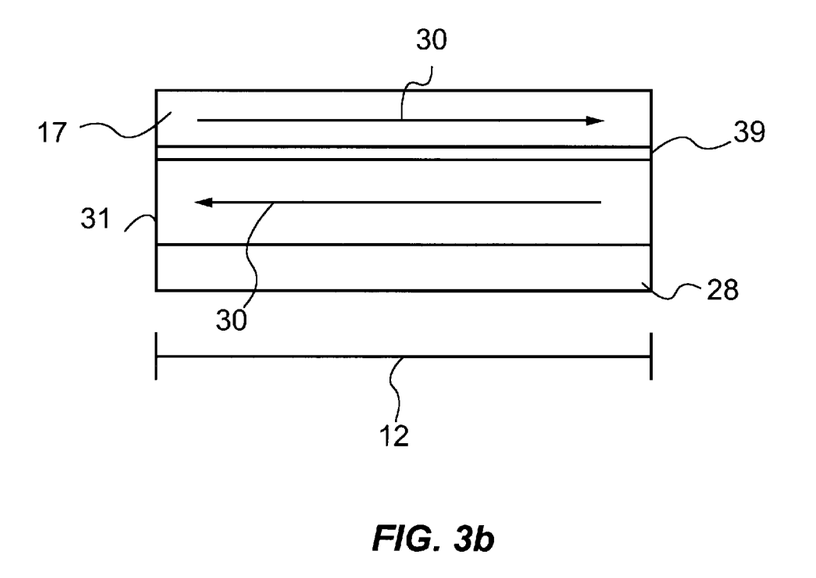
FIG. 3b is a front view a magnetic structure with magnetic layers and a non-magnetic spacer layer made according to the invention showing easy magnetic axis oriented along the width of the device.

FIG. 3a–b illustrate a top view and a front view of a magnetic structure 33 with non-magnetic spacer layers made in accordance with the invention. The magnetic layers 31 and 35 are anti-ferromagnetic through the non-magnetic transition metal spacer layer 39 in the range of magnetic layers and non-magnetic layer spacer thicknesses described in this specification and where saturation fields are greater than zero. In a preferred embodiment of this invention magnetic structures exhibit non-zero permeabilities ($\mu$) ranging in values form 200–2000, wherein the permeability is defined as $\mu=1+4\pi\chi$ (with $\chi$=the magnetic susceptibility in $cm^3/g$). The anti-ferromagnetically coupling in magnetic structures described in this invention provide a mechanism for canceling edge curling effects. Since the magnetic moments 30 of the magnetic layers 31 and 35 are coupled anti-ferromagnetically, the areas where there is edge curling in one layer 31 are nearly canceled by the areas of approximately equal size which are curled in an identical fashion with the opposite magnetization of the adjacent magnetic layer 35. This is a significant advantage over the prior art where, after the magnetization of the device is saturated in one direction parallel to the edges of the device, all of the curling regions at the edges of the device have the same net moment direction in each layer. Additionally, antiferromagnetic coupling layers overcome ferromagnetic coupling that occurs because of imperfections in the layers. FIG. 3b shows the alignment of the main bulk magnetic moments 30 on the front edge 12 of the magnetic structure 33.

Again referring to FIGS. 3a–b, the magnetic layer 31 is deposited on a suitable substrate 28 such as glass, silicon, quartz, ceramic, metal or other thin seed layers deposited for the purpose of providing a suitable flat template layer. A non-magnetic transition-metal spacer layer 39 is then deposited on the magnetic layer 31. Then a second magnetic layer 35 is deposited on the non-magnetic transition metal spacer layer 39. The process is repeated to provide a laminated structure with a number layers of alternating magnetic and non-magnetic spacer layers appropriate for the intended application. It will be clear to one skilled in the art that the above embodiment may be altered in many ways. The non-magnetic transition metal spacer layer 39 could equally be the first layer in the laminating sequence and the plurality of magnetic and non-magnetic transition spacer layer can be varied in order, thicknesses and composition throughout the laminate structure and within the specification of the invention.

Again referring to FIG. 3, the magnetic layers 31 and 35 are made of Ni, Fe, Co and alloys of Ni, Fe, and Co; preferably with 10 to 80 atomic percent nickel. The magnetic layers 31 and 35 are 10 to 400 Angstroms thick but are optimally 20 to 60 Angstroms thick. The non-magnetic spacer layer 39 is preferably made of an alloy with at least two elements selected from Os, Ru and Re, wherein preferred compositions are $Ru_{100-x}Os_x$, $Ru_{100-x}Re_x$, $Os_{100-x}Re_x$, with x>5 atomic percent with thicknesses ranging from 2.5 to 100 Angstroms. The non-magnetic layer is also a ternary alloy of elements Os, Ru and Re with a preferred composition of $Os_{100-(x+y)}Re_xRu_y$ with x+y<40 atomic percent with thicknesses ranging from 2.5 to 100 Angstroms. Optimally the averaged spacer layer 39 is 2.5 to 11 Angstroms thick and 17 to 25 Angstroms thick to achieve anti-ferromagnetic coupling. The laminated structure 33 made of magnetic layers 31 and 35 and at least one non-magnetic spacer layer 39, described above, exhibits coupling between the magnetic layers through the spacer layer 39 with a coupling strength that is oscillatory and dampened with increased thickness of the spacer layer. The anti-ferromagnetic coupling is strongest for magnetic structures with a non-magnetic spacer layer 39, that is 2.5 to 11 Angstroms thick and laminated with magnetic layers 31 and 35 that are 40 to 60 Angstroms thick. In the limits of these ultra-thin (2.5 to 11 Angstroms) non-magnetic transition metal spacer layers the integrity of the laminated magnetic structure is maintained and ferromagnetic coupling is reduced.

Figure 4:
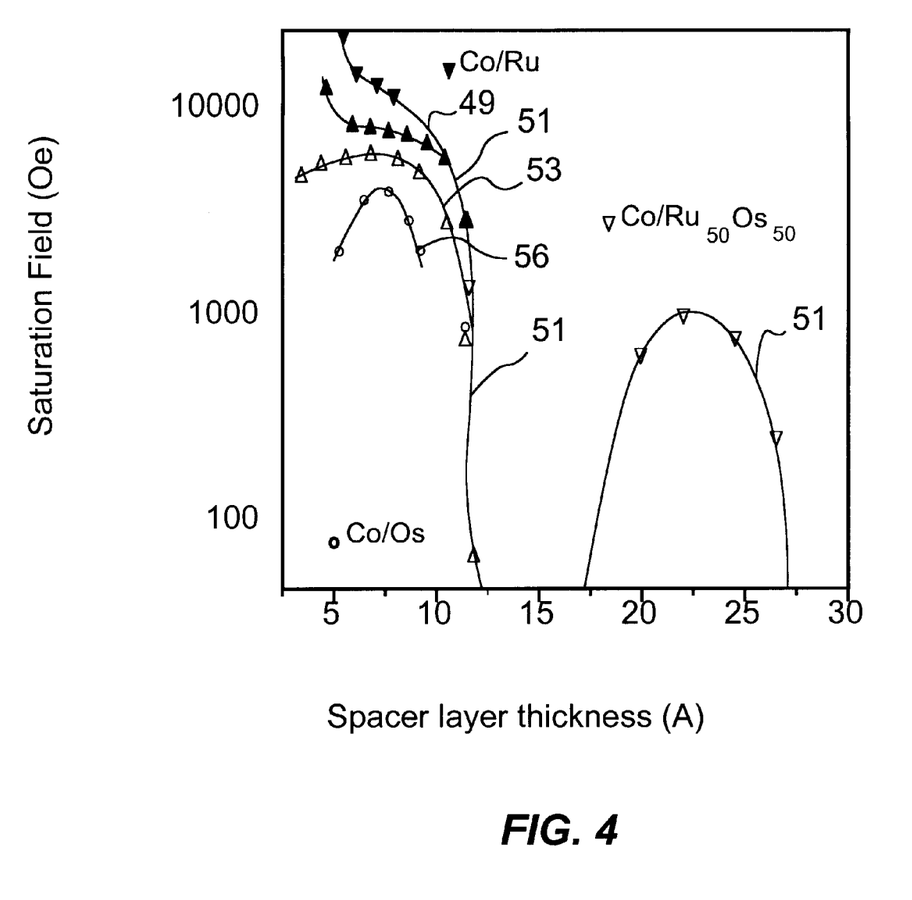
FIG. 4 is a graph of magnetization saturation versus spacer layer thicknesses for magnetic structures with Co magnetic layers and: a) Ru spacer layers; b) $Ru_{80}Os_{20}$ spacer layers and c) $Ru_{50}Os_{50}$ spacer layers and d0 Os spacer layers.

FIG. 4 is a graph of the magnetic saturation field versus spacer layer thicknesses for magnetic structures with Co magnetic layers and $Ru_{100-x}Os_x$ spacer layers, where x=0, 20, 50 and 100 atomic percent. The magnetic saturation field is the field that is needed to fully orient the magnetic moments of the magnetic layers comprising the device structure along with the applied field direction. This field is approximately proportional to the strength of the anti-ferromagnetic coupling of the layer via the spacer layers. When the coupling between the magnetic layers is approximately zero, the saturation field is determined by the intrinsic magnetic properties of the ferromagnetic layers themselves. Referring to curve 51, the saturation field versus spacer layer thicknesses for the magnetic structures with $Ru_{50}Os_{50}$ spacer layers oscillates with a frequency of 10 to 12 Angstroms. In curve 51 the saturation magnetic field values are increased above that of the magnetic layers themselves for magnetic structures with spacer layers of $Ru_{50}Os_{50}$ and with thicknesses between 17 and 27 Angstroms. The saturation field values are not increased for those magnetic structures with spacer layer thicknesses between 17 and 12 Angstroms. Then, between 12 to 2.5 Angstrom thicknesses, the saturation fields values are again increased. The ranges of spacer layer thicknesses where there are increased saturation fields values are the corresponding thicknesses of spacer layers that produce anti-ferromagnetic coupling of the magnetic layers. The oscillating saturation field with varying spacer thicknesses is observed in all laminated magnetic structures with thin (2.5–50 Angstroms) Os, Ru, and Re spacer layers although the details of the regions of anti-ferromagnetic coupling depend on both the spacer layer material and the ferromagnetic layers. Again referring to FIG. 4, the saturation field values decrease with increase percentage of Os alloyed with the Ru as seen comparing the curves 49, 51, 53 and 56. The saturation field values are directly proportional to the anti-ferromagnetic coupling strengths discussed below.

Figure 5:
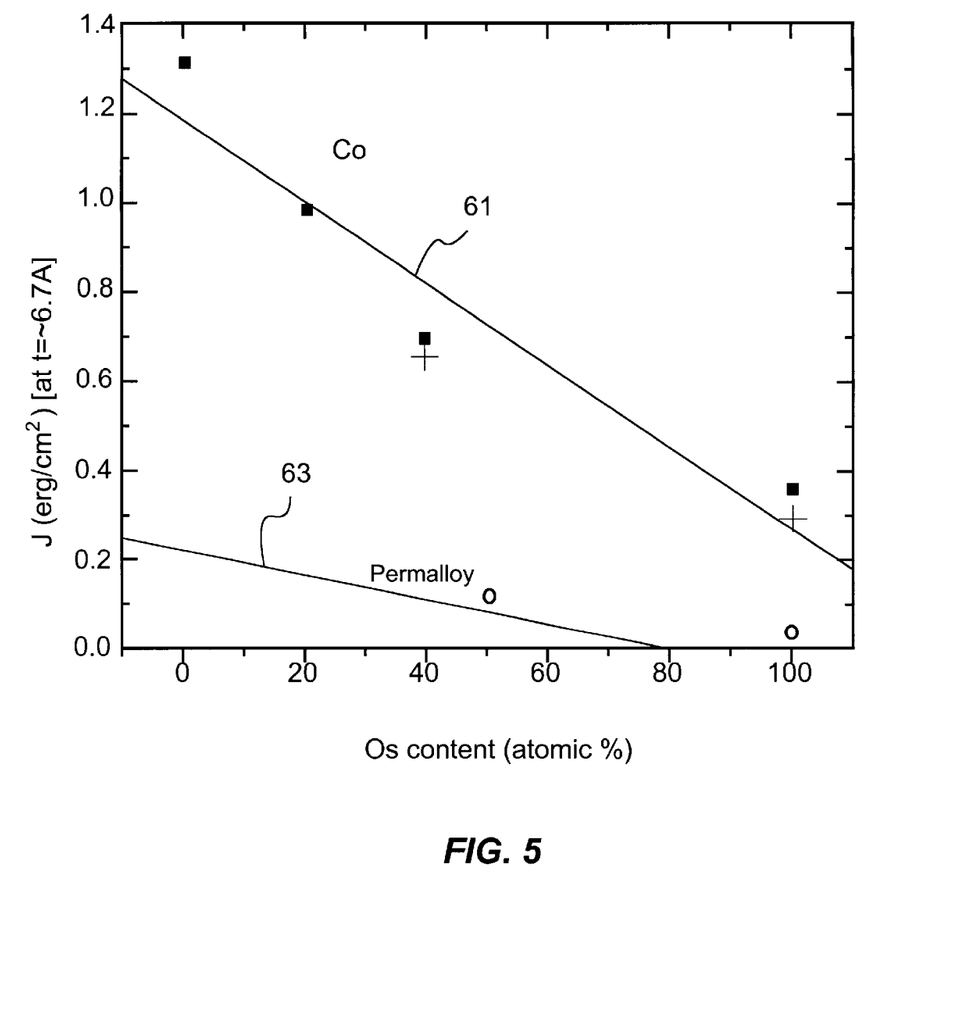
FIG. 5 is graph of coupling strengths (J) versus atomic percent Os for magnetic structures with: a) Co magnetic layers and with $Ru_{100-x}Os_x$ spacer layers, where x=0, 20, 50, and 100 atomic percent; b) permalloy magnetic layers with $Ru_{100-x}Os_x$ spacer layers, where x=50 and 100 atomic per cent.

Now referring to FIG. 5, line 61 plots the anti-ferromagnetic coupling strength (J) between Co magnetic layers in a magnetic structure versus percent Os in $Ru_{100-x}Os_x$ spacer layers with x=0, 20, 50 and 100 atomic percent and with the spacer layers at a constant thickness of 6.7 Angstroms. Line 63 plots the anti-ferromagnetic coupling strength between permalloy magnetic layers in a magnetic structure versus percent Os in $Ru_{100-x}Os_x$ spacer layers with X=50 and 100 atomic percent and a constant thickness of 6.7 Angstroms. The anti-ferromagnetic coupling values in lines 61 and 63 decrease linearly with increases in atomic percent Os in the $Ru_{100-x}Os_x$ spacer layers. Thus controlled alloying of Ru with Os provides a method for controlling the anti-ferromagnetic coupling strength. In fact controlled alloying of any combination of Os, Ru and Re when used as thin spacer layers in magnetic devices provides a method for controlling the anti-ferromagnetic coupling. Additionally, there is a strong dependence on the anti-ferromagnetic coupling values with the type of magnetic material used in the magnetic layers. Referring to line 63, the magnetic layers are permalloy. The magnetic structure containing permalloy magnetic layers show coupling values significantly less than the corresponding structures with Co magnetic layers. The coupling strengths that are most useful for the invention are between 0.001 to 2.00 erg/cm$^2$.

Figure 6:
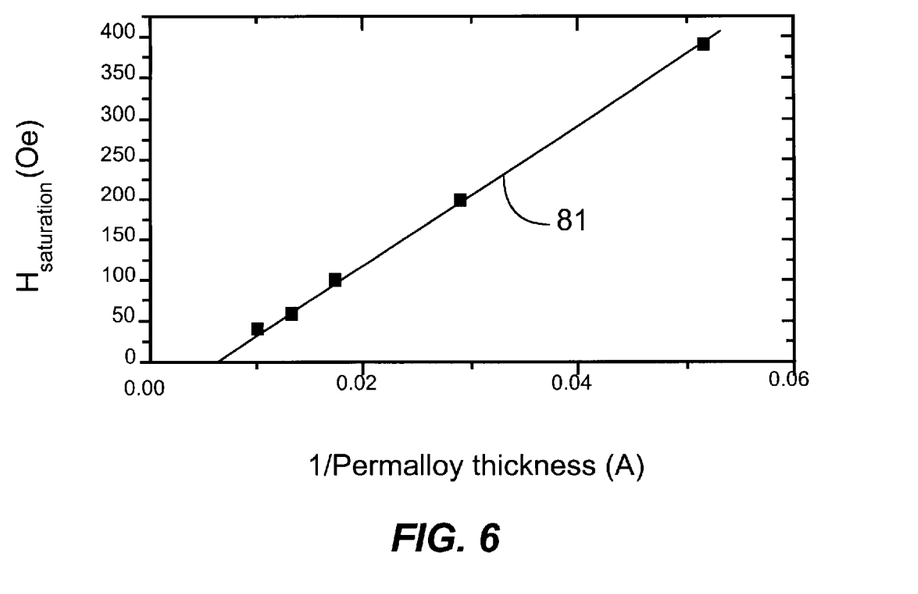
FIG. 6 is a graph of magnetic saturation field versus inverse permalloy thickness for a magnetic structures with permalloy magnetic layers and Os spacer layers.

FIG. 6 is a graph of the magnetic saturation field versus inverse permalloy thickness for magnetic structures with permalloy magnetic layers and Os spacer layers approximately 6.7 Angstroms thick. Line 81 shows that the saturation magnetic field values are related approximately linearly to the reciprocal thicknesses of the permalloy.

Figure 7:
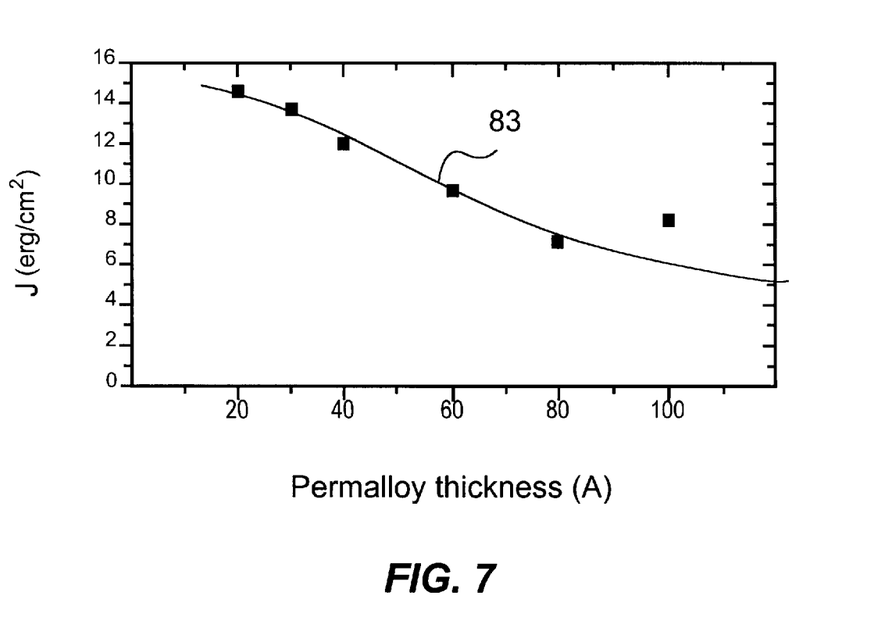
FIG. 7 is a graph of coupling strength (J) versus permalloy thickness for magnetic structures with permalloy magnetic layers and Os spacer layers.

Referring to FIG. 7 displaying a graph of the anti-ferromagnetic coupling strength versus permalloy thickness for magnetic structures with permalloy magnetic layers and Os spacer layers. Line 83 shows that the coupling strengths of the magnetic layers decrease with increased thicknesses of the permalloy layers. Thus the thickness of the magnetic layers offers a method for controlling the anti-ferromagnetic coupling values of the laminated magnetic structures containing ultra-thin non-magnetic transition metal spacer layers.

Figure 8A:
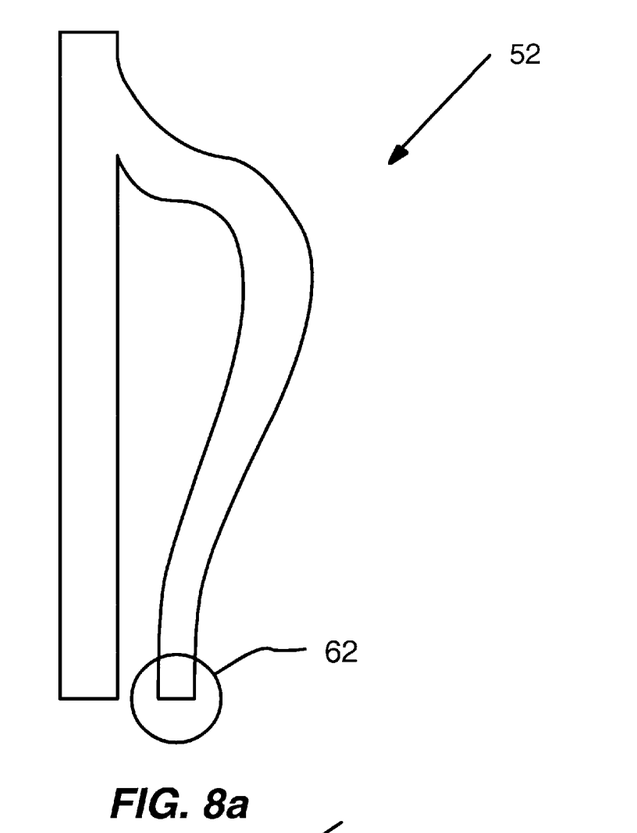
FIG. 8 is an illustration of a magnetic read-write device made in accordance with the invention.
Figure 8B:
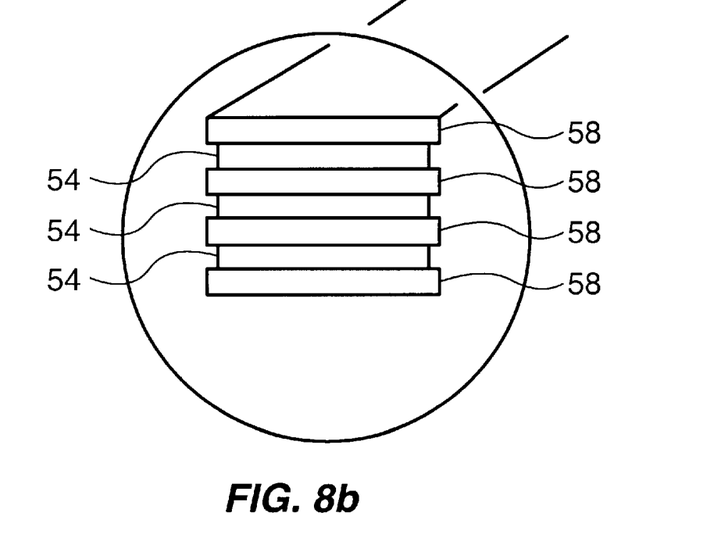

FIG. 8a shows an exemplary magnetic pole configuration 52 according to the invention. FIG. 8b is a magnified front view of the encircled portion 62 of the magnetic pole configuration 52 from FIG. 8a For illustration, the magnetic layers 58 of the pole are permalloy. The non-magnetic transition metal spacer layers 54 are Os. The magnetic and non-magnetic layers of the head construction are laminated in an alternating sequence so that each magnetic layer is confined by spacer layers. A head device also comprises an electric coil that circles the yoke and has contacts available to connect to the electronic circuitry (not shown).

It will be clear to anyone skilled in the art that by varying the thicknesses and compositions of both the magnetic and non-magnetic layers a multitude of devices can be designed for applications in magnetic read head, a magnetic write head, a magnetic memory device, a transformer and a inductor.

What is claimed is:

1. A magnetic head device comprising a write head pole having more than two laminated magnetic structures, wherein each laminated magnetic structure includes:
    a) at least two magnetic layers comprising elements selected from the group consisting of nickel, iron and cobalt; and
    b) at least one non-magnetic layer disposed between said at least two magnetic layers, said at least one non-magnetic layer comprising alloys with at least two elements selected from the group consisting of osmium, ruthenium and rhenium;
    wherein said laminated magnetic structure exhibits a permeability value of 200 to 2000.

2. The magnetic head device of claim 1 wherein said at least two magnetic layers have anti-ferromagnetic coupling values ranging from 0.001 to 2.00 erg/cm$^2$.

3. The magnetic head device of claim 1 wherein said laminated magnetic structure magnetically saturates in field strengths ranging from 10 to 200 Oersteds.

4. The magnetic head device of claim 1 wherein said at least two magnetic layers range from 10 to 400 Angstroms thick.

5. The magnetic head device of claim 1 wherein said at least two magnetic layers have compositions of 10 to 80 atomic percent nickel.

6. The magnetic head device of claim 1 wherein said at least one non-magnetic layer ranges from 2.5 to 50 Angstroms thick.

7. The magnetic write head pole of claim 1 wherein said at least one non-magnetic layer has compositions $Ru_{100-x}Os_x$, $Ru_{100-x}Re_x$, $Os_{100-x}Re_x$, with atomic percent x>5.

8. The magnetic head device of claim 1 wherein said at lest one non-magnetic layer has compositions $Os_{100-(x+y)}Re_xRu_y$ with x+y<40 atomic percent.

9. A magnetic read and write head comprising a write head pole having more than two laminated magnetic structures, wherein each laminated structure includes:
   a) at least two magnetic layers comprising elements selected from the group consisting of nickel, iron and cobalt; and
   b) at least one non-magnetic layer disposed between said at least two magnetic layers, said at least one non-magnetic layer comprising alloys with at least two elements selected from the group consisting of osmium, ruthenium and rhenium;
wherein said at least two magnetic layers are anti-ferromagnetic coupled, and said at least one non-magnetic layer allows the control of the anti-ferromagnetic coupling between said at least two magnetic layers.

10. The magnetic read and write head of claim 9 wherein said at least two magnetic layers range from 10 to 400 Angstroms thick.

11. The magnetic read and write head of claim 9 wherein said at least two magnetic layers have compositions of 10 to 80 atomic percent nickel.

12. The magnetic read and write head of claim 9 wherein said at least one non-magnetic layer ranges from 2.5 to 50 Angstroms thick.

13. The magnetic read and write head of claim 9 wherein said at least one non-magnetic layer has compositions $Ru_{100-x}Os_x$, $Ru_{100-x}Re_x$, $Os_{100-x}Re_x$, with atomic percent x>5.

14. The magnetic read and write head of claim 9 wherein said at least one non-magnetic layer has compositions $Os_{100-(x+y)}Re_xRu_y$ with x+y<40 atomic percent.

15. The magnetic read and write head of claim 9 wherein said at least two magnetic layers have anti-ferromagnetic coupling values ranging from 0.001 to 2.00 erg/cm².

16. The magnetic read and write head of claim 9 wherein said laminated magnetic structure magnetically saturates in field strengths ranging from 10 to 200 Oersteds.

* * * * *